W. G. WILSON & R. N. CHIPMAN.
WEED KILLING TRAIN.
APPLICATION FILED AUG. 7, 1916.
1,205,070.
Patented Nov. 14, 1916.
3 SHEETS—SHEET 1.
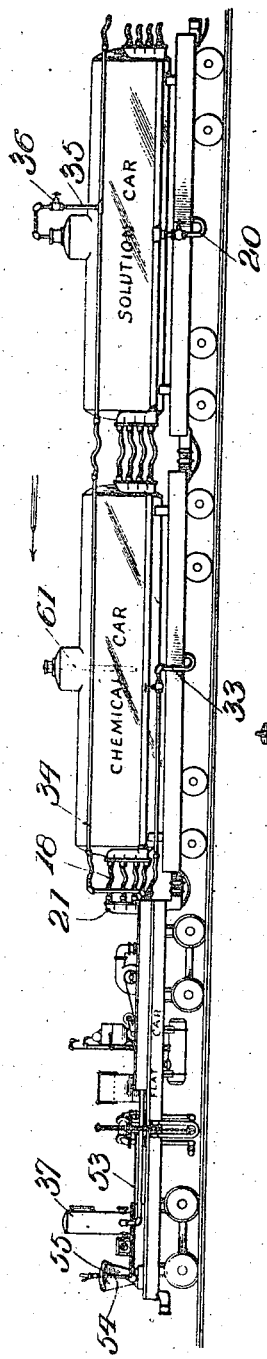
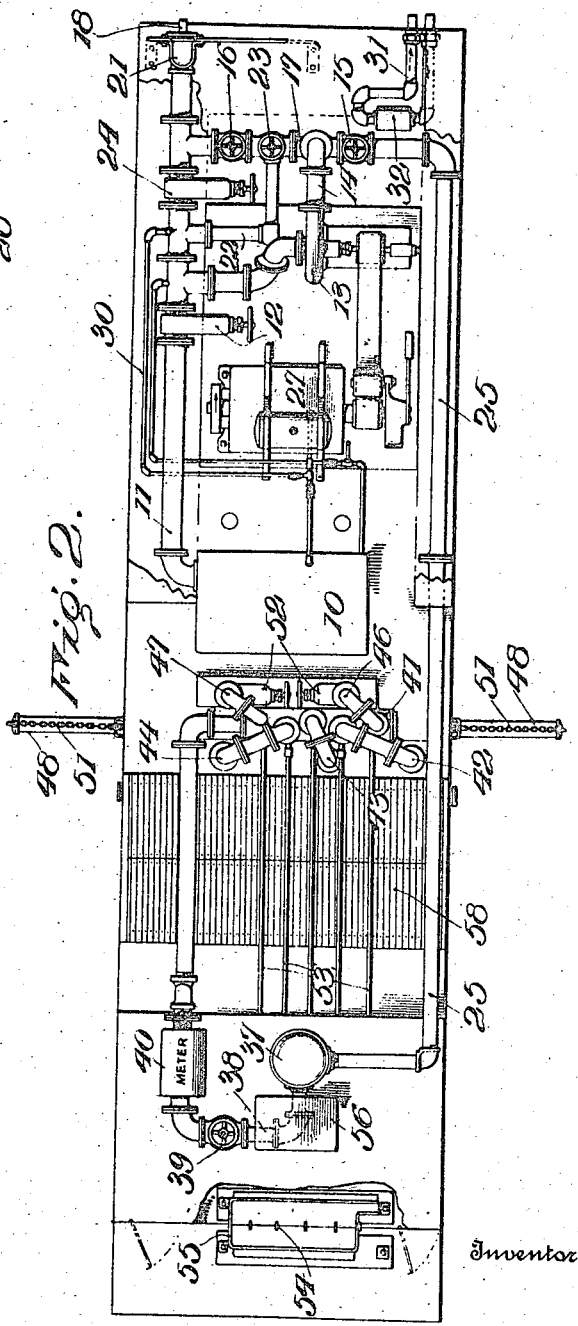
Inventors
W. G. Wilson
R. N. Chipman
By Browne & Phelps Attorneys

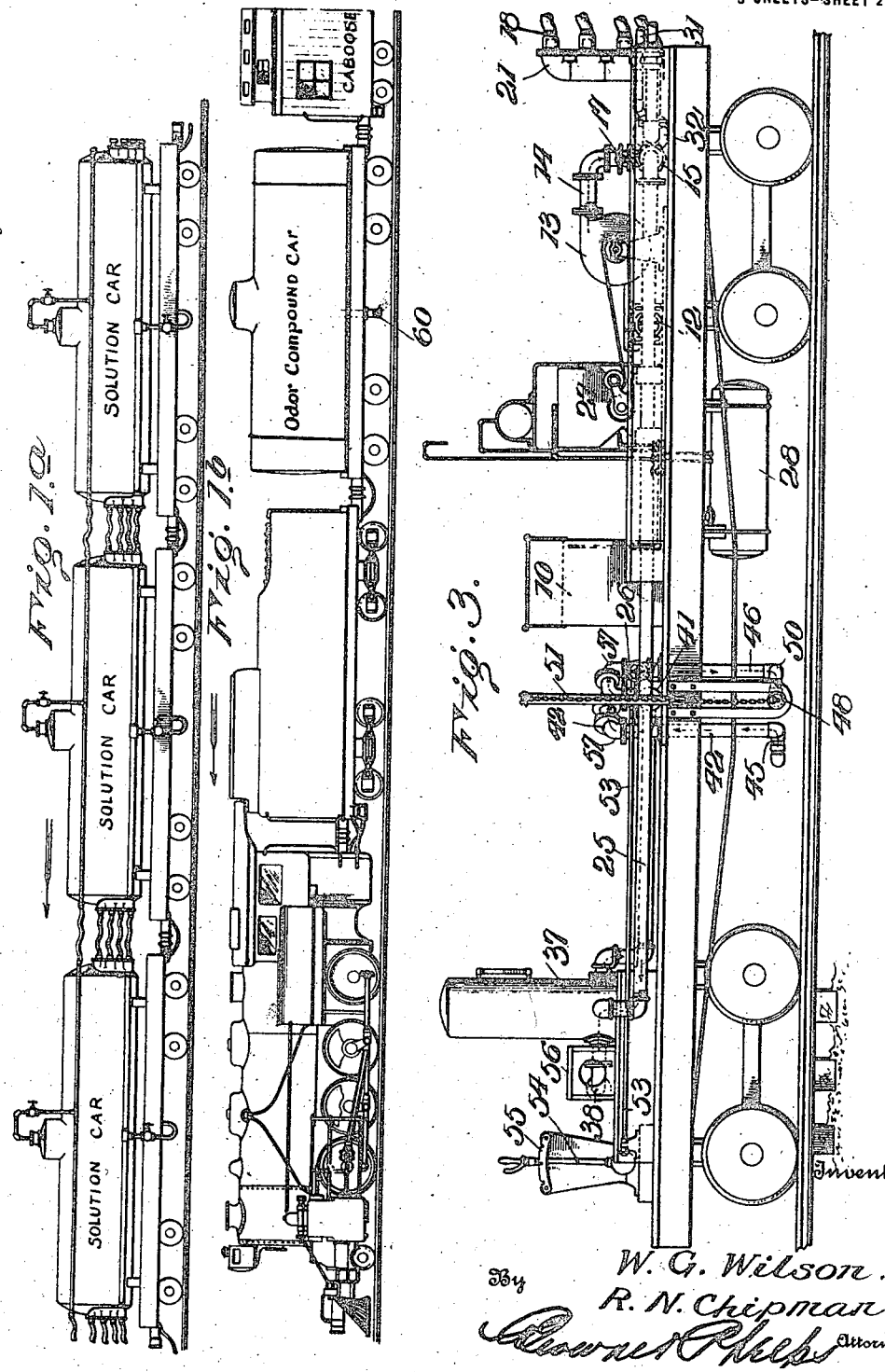

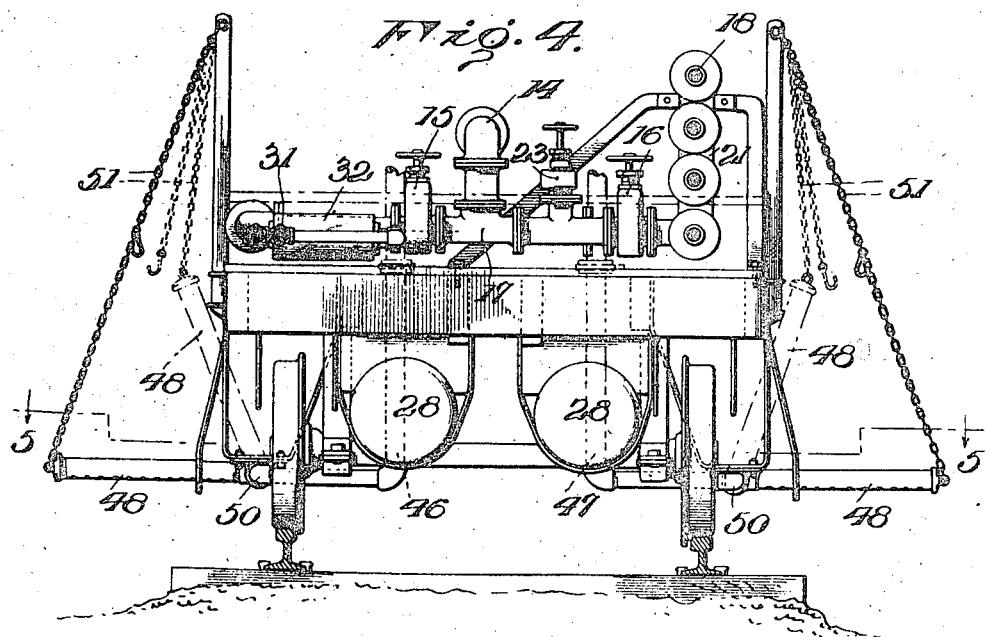

UNITED STATES PATENT OFFICE.

WYLIE GEMMEL WILSON AND RALPH NELSON CHIPMAN, OF NEW YORK, N. Y.

WEED-KILLING TRAIN.

1,205,070.   Specification of Letters Patent.   Patented Nov. 14, 1916.

Application filed August 7, 1916. Serial No. 113,633.

*To all whom it may concern:*

Be it known that we, WYLIE G. WILSON, a subject of the King of Great Britain, residing at New York, in the county of New York and State of New York, and RALPH NELSON CHIPMAN, a citizen of the United States, residing at New York, in the county of New York and State of New York, have invented certain new and useful Improvements in Weed-Killing Trains, of which the following is a specification.

This invention relates to weed killing trains and more particularly to trains adapted to carry weed killing means in liquid form capable of spraying the same along the track and at both sides thereof as the train progresses.

One of the objects of the present invention is to provide a train of the above general character composed of a plurality of cars adapted to contain suitable weed killing solutions which may be easily and economically managed and operated.

A further object is to provide a weed killing apparatus in the form of a train which will be complete and self-contained.

A further object is to provide a train of the last above mentioned character with means whereby various portions of the right-of-way may be sprayed or treated to the exclusion of others.

A further object is to provide in a train of the above character a main operating car having localized points of control whereby the entire apparatus may be operated with a minimum of labor.

Other objects will be in part obvious from the annexed drawings and in part indicated in connection therewith by the following anaylsis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figures 1, 1ª and 1ᵇ (Sheets 1 and 2) are elevational views, somewhat diagrammatic, showing the entire train or apparatus and the units of which it is composed. Fig. 2 is a plan view of the operating car. Fig. 3 is a side elevation of the same car. Figs. 4 and 5 are transverse and plan sectional views respectively of the spraying members.

In order that a clearer perception of the present invention may be had, it may be noted that railroads have experienced considerable difficulty from weeds growing along the right-of-way of their lines which are more or less injurious to the track equipment for several reasons, one being that they collect dampness causing rot and deterioration of the ties and woodwork, and also that cattle are attracted thereby to the right-of-way and are killed by passing trains. The present apparatus is designed to spray the weeds with a poison to kill the same and an odor compound having a taste or odor offensive to cattle, more particularly intended to prevent the cattle from eating the poison sprayed weeds.

Referring now to the drawings in detail and particularly to Figs. 1, 1ª and 1ᵇ, at the head of the train is placed a flat car having the major part of the operating means for directing and controlling the spray as well as the filling and supplying of the various cars placed thereafter. The first car immediately behind the flat car may be referred to as the chemical tank car containing a relatively strong solution of a weed killing poison behind which are a plurality of ordinary tank cars indicated as solution cars, adapted in the first place to be filled with water. The number of cars, of course, may be varied at will, five however is found sufficient to spray the track from one water tank to the next usually a distance of about twenty miles. These five cars will be hereinafter referred to as solution cars, for it is in these cars that the weed killing solution is mixed before the train starts, as will be hereinafter explained and from which it is drawn to be sprayed along the track. Immediately following the last solution car is a locomotive or other source of power which in turn is followed by an odor compound car, preferably in the form of an ordinary tank car supplied with spraying means underneath thereof, and finally a caboose or tool car to provide quarters for the operators of the train. In making up this train, the chemical car is filled with chemicals at the desired degree of concentration and the five solution cars immediately following are filled with water from any stand pipe, or if this is impracticable, due to the height of the cars, a small low tank upon the flat car connected with a pump is filled from the stand pipe and the pump operated to fill the solution cars therefrom. The odor compound car being a unit by itself is filled and operated in any desired manner. All of these six or seven cars are suitably connected one with another by flexible connections leading to the front or flat car from which the spraying of the liquid is controlled.

Referring now to Figs. 2 and 3 of the drawings, in which the flat car is shown in detail, there is denoted a relatively large low tank 10 in the central part thereof, adapted to receive water from a stand pipe at the side of the track when for other reasons the water cannot be delivered directly to the solution tank cars. A relatively large pipe 11 having a valve 12 leads from the lower part of this tank to a pump 13 closely adjacent thereto of any sufficient type, which pump is connected to an outlet pipe 14 also having valves 15—16 in a branch pipe 17. One arm of this pipe 17 is flexibly connected by hose connections 18 as shown in Fig. 1 to pipes leading past the chemical car to each of the solution cars. Branch pipes 20 are connected therewith to the bottom of each solution tank car, whereby the same may be filled or emptied as desired. It is to be noted that this connection 18 comprises an upright standard 21 at the rear of the flat car and at both ends of each of the tank cars to permit the use of a plurality of relatively small flexible couplings rather than one large coupling which would tend to kink when going around curves.

There is provided in pipe 17 a by-pass 22 having a valve 23 connecting the pipes adjacent the pump, whereby the pump may be operated continuously if desired, while disconnections or temporary shut offs are being made. The valves 12—16—15 and 24 are provided at several points, as shown, to separate the tank 10 on the flat car from the main pipe when the pump is operated to draw solution from the solution cars and force the same to a pipe 25 thence to the spraying device at the front of the flat car. The pump 13 is preferably driven by an internal combustion engine 27 and gasolene storage tanks 28 are suspended from beneath the car, as shown clearly in Fig. 3. The engine 27 is water cooled by means of connections 30.

At the rear of the flat car is provided a looped piping 31 containing a meter 32, one end of which loop is adapted to be connected with the underside of the chemical car at 33 and the other end to a pipe 34 running over the tops of the solution cars having branch connections 35 with each manhole whereby the chemical solution is driven out of the bottom of the chemical car preferably by compressed air 61 from the locomotive compressor and forced into each solution car in the amount desired, as indicated by the meter. It is, of course, to be understood that the several branches leading to the manholes of the solution cars are provided with valves 36 and the meter upon the flat car will permit one easily to determine the passage of the desired quantity of chemical.

Connected with the discharge end of the pump and leading to the forward end of the flat car is the main and relatively large supply pipe 25 as above stated, which passes into an air vessel or reservoir tank 37, where the shocks arising from the pumping operation are absorbed. An outlet 38 leads from this air tank through a meter 40 thence to a valve box 41 centrally disposed with respect to the car. This valve box has five outlets, three of which 42—43—44 being directed forwardly and provided with depending elbows 45 (Fig. 5) and laterally arranged, adapted to spray the central part of the track and over each rail. The rearwardly directed pipes 46—47 are provided with relatively long lateral projections 48 provided with turnable elbows 50 adapted to spray the right-of-way at considerable distance to each side of the track. These projecting ends 50 are suspended by chains 51 as shown in Figs. 3—4 and 5, whereby they may be conveniently and quickly raised as when passing a station platform or another train. These last two discharge connections are provided with manually operated valves 52 so that when it is not desired to spray each side of the track, they may be temporarily eliminated. Besides these manually operated valves, however, there is positioned in the valve box 41 a gate or slide valve 26 of any ordinary form for each discharge opening. Each valve is connected by means of a rod 53 leading to the forward end of the car where it is connected with its respective operating lever 54, mounted in a suitable quadrant 55, as shown in Fig. 3. Thus, one or all of the valves may be easily and quickly operated by an attendant who is provided with a suitable seat 56 at that location. It is to be noted that each one of the discharge outlets is provided with an upwardly projecting loop 57, Fig. 3, thereby to minimize drainage of any liquid or solution from the line after it is desired to stop the spraying, thus providing a quick cut off. The central part of the car between the operator's seat and the valve box is provided with a grating 58, whereby the attendant may watch the spraying nozzles and see if they are operating properly.

The method of use and operation of a train of this character is substantially as follows: The chemical tank and solution tanks are filled with the chemical and water respectively and then mixed to the proper degree as already explained by forcing the chemical solution in desired quantities by means of compressed air from the chemical tank to each of the solution tanks. Should it be necessary to fill the solution tanks with water from the flat car tank 10, then the valves 12 and 16 are opened and the valves 15 and 24 are closed which will permit the water to pass from the tank 10 to the pump 13 and out through the connection 18. When the pump is operating to draw the solution from the tanks and send it to the spraying device the valves 24 and 15 are opened and 12 and 16 are closed. When, however, the spraying apparatus is to be entirely shut off the valve 23 comes into operation at a predetermined pressure, thus permitting a circuitous flow of the solution through the pump and by-pass, as it frequently happens in operation that the train will stop for a moment, as when opening a switch, and under such circumstances it is desirable to turn off the spray but not to stop the pump. The sprays are of course controlled as may be necessary to meet the requirements of the track or right-of-way to be sprayed.

The odor compound car is preferably under the control of one man and is provided with a transversely disposed sprayer 60 and controlling valves of any desired type.

From the above, it will be seen that the present invention provides a practical and efficient weed killing train with the parts so positioned and arranged as to permit convenient manipulation and operation. The points of control are localized in such a manner that one man may control the entire flow to the spraying apparatus at the front of the car, a second to control the raising and lowering of the laterally projecting sprays 48, another can easily manage the pump and valves directly associated therewith at the rear of the car. The positioning and arranging of the pump and supply tank 10 upon the flat car permits the filling of all of the solution cars under any condition. The novel arrangement of valves, by-passes, etc., associated with the pump, permits this pump to perform its several functions in a simple and practical manner. The connections between the several cars insures a uniform flow of solution to the pump from one or more cars under varying conditions. It is therefore believed that the present invention accomplishes, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus described our invention what we claim as new and desire to secure by Letters Patent is:

1. In a weed killing train, in combination, a controlling car, a solution car, a plurality of flexible connections between said cars through which the solution is adapted to pass under all conditions and a pump on said controlling car for forcing out the solution from the solution car under pressure.

2. In a weed killing train, in combination, a controlling car, a solution car connected therewith, a pump on said controlling car and piping connected with said pump and the solution car whereby a liquid may be forced in either direction through said connection.

3. In a weed killing train, in combination, a controlling car having a spraying device, a solution car, a connection between said cars through which liquid is adapted to pass, a pump mounted on said controlling car, and branch pipes leading from the discharge end of said pump having valves associated therewith adapted to direct the discharge from the pump to either the solution car or to the spraying device carried by said controlling car.

4. In a weed killing train, in combination, a controlling car, a solution car connected therewith, a spraying device located on said car, a pump adapted to draw solution from the car and force the same to said spraying device, and an intervening air chamber adapted to take up the shock caused by the pump and permit a uniform discharge from the spraying device.

5. In a weed killing train, in combination, a controlling car, a pump, a spraying device comprising a plurality of spraying nozzles to which a solution is adapted to be pumped, a valve for each of said nozzles, and a single point of control for operating said valves.

6. In a weed killing train, in combination, a controlling car carrying a plurality of spraying nozzles, a pump, a temporary reservoir adapted to receive a solution discharged by said pump before it passes to said spraying nozzles, a valve associated with each of said nozzles, and a plurality of hand operated levers positioned at a single point of control adapted to operate said valves.

7. In a weed killing train, in combination, a controlling car, a plurality of spraying nozzles, manually operated valves for some of said nozzles closely adjacent thereto, auxiliary valves for said nozzles, a single point of control for said last-mentioned valves, a pump adapted to supply a solution to said nozzles, and an air chamber between the pump and the nozzles adapted to take up the shock caused by the pumping of the solution.

8. In a weed killing train, in combination, a controlling car, a chemical car, and a solution car, and connections between said cars adapted to permit a quantity of chemical to pass from the chemical car to the controlling car and thence to the solution car.

9. In a weed killing train, in combination, a controlling car, a chemical car, and a solution car, and connections between said cars adapted to permit a quantity of chemical to pass from the chemical car to the controlling car and thence to the solution car, and means associated with said train for forcing the chemical through said connections.

10. In a weed killing train, in combination, a controlling car, a chemical car, and a solution car, and connections between said cars adapted to permit a quantity of chemical to pass from the chemical car to the controlling car and thence to the solution car, means associated with said train for forcing the chemical through said connections, and an odor compound car at the rear of said train.

11. In a weed killing train, in combination, a controlling car, a chemical car and a solution car and connections between said cars adapted to permit a quantity of chemical to pass from the chemical car to the controlling car and thence to the solution car, and means on said controlling car for drawing the solution from the solution car and sprinkling it along the track.

12. In a weed killing train, in combination, a chemical car, a plurality of solution cars, and a controlling car, means for forcing the chemical from the chemical car to the solution car, and means on the controlling car for drawing the solution from the solution cars and distributing it along the right of way.

In testimony whereof we affix our signatures in presence of two witnesses.

WYLIE GEMMEL WILSON.
RALPH NELSON CHIPMAN.

Witnesses:
 MARGUERITE D. GEBHARDI,
 MORRIS DEVERICH.